(12) United States Patent
Srivastava et al.

(10) Patent No.: US 9,633,830 B2
(45) Date of Patent: Apr. 25, 2017

(54) PHOSPHOR-CONTAINING COATING SYSTEMS AND FLUORESCENT LAMPS EQUIPPED THEREWITH

(71) Applicant: GENERAL ELECTRIC COMPANY, Schenectady, NY (US)

(72) Inventors: Alok Mani Srivastava, Niskayuna, NY (US); William Winder Beers, Chesterland, OH (US); Fangming Du, Northfield, OH (US); William Erwin Cohen, Solon, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/471,413

(22) Filed: Aug. 28, 2014

(65) Prior Publication Data
US 2016/0064203 A1 Mar. 3, 2016

(51) Int. Cl.
| | |
|---|---|
| *C09K 11/02* | (2006.01) |
| *H01J 61/44* | (2006.01) |
| *C09D 5/22* | (2006.01) |
| *C09K 11/08* | (2006.01) |
| *C09K 11/57* | (2006.01) |
| *H01J 61/48* | (2006.01) |
| *C09K 11/64* | (2006.01) |
| *H01J 61/20* | (2006.01) |

(Continued)

(52) U.S. Cl.
CPC ............. *H01J 61/44* (2013.01); *C03C 17/23* (2013.01); *C03C 17/3417* (2013.01); *C09D 5/22* (2013.01); *C09K 11/08* (2013.01); *C09K 11/57* (2013.01); *C09K 11/64* (2013.01); *C09K 11/643* (2013.01); *H01J 61/20* (2013.01); *H01J 61/48* (2013.01)

(58) Field of Classification Search
CPC . H01J 61/44; H01J 61/20; H01J 61/48; C09K 11/643; C09D 5/22
See application file for complete search history.

(56) References Cited

U.S. PATENT DOCUMENTS

| | | |
|---|---|---|
| 2,494,883 A | 1/1950 | Anne et al. |
| 3,569,764 A | 3/1971 | Hanada et al. |

(Continued)

FOREIGN PATENT DOCUMENTS

| | | |
|---|---|---|
| EP | 0067030 A2 | 12/1982 |
| JP | 2001172623 A | 6/2001 |

(Continued)

OTHER PUBLICATIONS

European Search Report and Opinion issued in connection with corresponding EP Application No. 15182219.4 on Jan. 11, 2016.

*Primary Examiner* — Tracie Y Green
(74) *Attorney, Agent, or Firm* — GE Global Patent Operation; Peter T. DiMauro

(57) ABSTRACT

Coating systems suitable for use in generating fluorescent visible light, and lamps provided with such coating systems. The coating systems includes a phosphor-containing coating that contains at least a first phosphor that is predominantly excited by ultraviolet radiation of a first wavelength to emit visible light and absorbs but is less efficiently excited by ultraviolet radiation of a second wavelength. The coating system further includes a second phosphor that absorbs the ultraviolet radiation of the second wavelength and little if any of the ultraviolet radiation of the first wavelength.

19 Claims, 1 Drawing Sheet

(51) Int. Cl.
  *C03C 17/23* (2006.01)
  *C03C 17/34* (2006.01)

(56) References Cited

U.S. PATENT DOCUMENTS

| | | | |
|---|---|---|---|
| 3,707,641 | A | 12/1972 | Thornton |
| 4,070,598 | A * | 1/1978 | DeLuca ............. C09K 11/7773 |
| | | | 252/301.4 H |
| 5,801,483 | A | 9/1998 | Watanabe et al. |
| 2008/0136311 | A1* | 6/2008 | Setlur ................... H01J 61/44 |
| | | | 313/486 |
| 2008/0238290 | A1* | 10/2008 | Sigai .................. C09K 11/7734 |
| | | | 313/486 |
| 2012/0068592 | A1 | 3/2012 | Srivastava et al. |
| 2013/0026905 | A1* | 1/2013 | Du ......................... C09K 11/76 |
| | | | 313/487 |
| 2013/0076228 | A1 | 3/2013 | Du et al. |
| 2015/0054399 | A1* | 2/2015 | Du ........................... B32B 9/04 |
| | | | 313/486 |

FOREIGN PATENT DOCUMENTS

| | | | | |
|---|---|---|---|---|
| JP | | 2009295541 A | 12/2009 | |
| WO | | 2006072919 A2 | 7/2006 | |
| WO | WO 2006072919 A2 * | | 7/2006 | ........... C09K 11/592 |

* cited by examiner

PHOSPHOR-CONTAINING COATING SYSTEMS AND FLUORESCENT LAMPS EQUIPPED THEREWITH

BACKGROUND OF THE INVENTION

The present invention generally relates to lighting systems and related technologies. More particularly, this invention relates to phosphors and coating systems utilized by fluorescent lamps to generate visible light.

Fluorescent lamps have been in use and commercialization since the 1930s. More recently, both consumers and producers have voiced increased desire for energy efficiency and environmental impact of products, spanning all industries, including the lighting industry. As such, fluorescent lights have seen an increase in usage due to their increased energy efficiency when compared to conventional incandescent lights. Significant effort and research have been made in the interest of improving fluorescent light lumen output without increasing power requirements or significantly increasing material costs.

A nonlimiting example of a fluorescent lamp 10 is schematically represented in FIG. 1. The lamp 10 is represented as having a sealed tube comprising a transparent (for example, glass) envelope or shell 12 enclosing an interior chamber 14. The chamber 14 is preferably at very low pressure, for example, around 0.3% atmospheric pressure, and contains a gas mixture having at least one constituent that can be ionized to generate radiation that includes ultraviolet (UV) wavelengths. According to the current state of the art, such a gas mixture typically includes one or more inert gases (for example, argon) or a mixture of one or more inert gases and other gases at a low pressure, along with a small quantity of mercury vapor. Electrodes 16 inside the chamber 14 are electrically connected to electrical contact pins 18 that extend from oppositely-disposed bases 20 of the lamp 10. When the contact pins 18 are connected to a power source, the applied voltage causes current to flow through the electrodes 16 and electrons to migrate from one electrode 16 to the other electrode 16 at the other end of the chamber 14. In the process, this energy converts a small amount of the liquid mercury from the liquid state to a charged (ionized) gaseous (vapor) state. The electrons and charged gas molecules move through the chamber 14, occasionally colliding with and exciting the gaseous mercury molecules, raising the energy level of the electrons in the mercury atoms. In order to return to their original energy level, the electrons release photons.

Due to the arrangement of electrons in mercury atoms, most of the photons released by these electrons are in the ultraviolet (UV) wavelengths. This is not visible light, and as such for the lamp 10 to emit visible light these photons must be converted to a visible light wavelength. Such a conversion can be performed by a coating 22 disposed at the interior surface of the transparent shell 12. The coating 22 often contains phosphor powders and is separated from the shell 12 by a UV-reflecting barrier layer 24 of, for example, alumina ($Al_2O_3$). The UV wavelengths emitted by the ionized mercury vapor are absorbed by the phosphor composition within the coating 22, resulting in excitation of the phosphor composition to produce visible light that is emitted through the shell 12. More particularly, when electrons of the phosphor are struck by photons, the electrons become excited to a higher energy level and emit a photon to return to their original energy level. The emitted photon has less energy than the impinging photon and is in the visible light spectrum to provide the lighting function of the lamp 10. The color and luminosity of the lamp 10 are largely the result of the phosphor or phosphors used in the coating 22.

The mercury in low pressure fluorescent lamps predominantly emits UV radiation having a wavelength of 254 nm, and to a lesser extent a wavelength of 185 nm. As used herein, "predominantly" and "predominant" mean that something contains more of one constituent (the "predominant constituent"), e.g., by weight, volume, molar, or other quantitative percent, than any other individual constituent. As these terms are used herein in relation to radiation, "predominantly" and "predominant" signify a wavelength that is more prevalent in a band of radiation than any other individual wavelength. Some estimates are that roughly 90% of UV radiation generated by low pressure fluorescent lamps is at the predominant 254 nm wavelength, with the balance (roughly 10%) being the 185 nm wavelength. Both of these wavelengths fall within a wavelength range known as ultraviolet subtype C. Phosphors used in low pressure mercury lamps are typically excited by different ranges of wavelengths encompassing the primary wavelength (254 nm) to absorb as much UV radiation as possible. Aluminate phosphors and particularly barium-magnesium-aluminates (BAM) are examples of phosphors widely used as components of phosphor blends in fluorescent lamps intended for white light generation. BAM phosphors having the general formula $BaMg_2Al_{16}O_{27}:Eu^{2+}$ absorb the predominant 254 nm wavelength as well as the secondary 185 nm wavelength of UV radiation emitted by low pressure mercury lamps, and utilize europium ions as an activator to impart the desired phosphor property. As known in the art, the terms "activator" and "activated" refer to the effect that doping with dopants, for example, europium, manganese, cerium, terbium, etc., have with respect to the luminescence of a phosphor. For example, whereas BAM phosphor activated by divalent europium ($BaMg_2Al_{16}O_{27}:Eu^{2+}$) primarily absorbs UV radiation at the 254 nm wavelength to emit blue visible light, barium-magnesium-aluminate can be co-activated by divalent europium and manganese ($BaMg_2Al_{16}O_{27}:Eu^{2+},Mn^{2+}$) to primarily absorbs UV radiation at the 254 nm wavelength to emit blue-green visible light. Both of these phosphors also generate visible light as a result of absorption of the secondary 185 nm wavelength, but their visible light generation resulting from their absorption of this wavelength is much less efficient than for the 254 nm wavelength, with the result that the proportional amount of lumens attributable to the absorption of the 254 nm wavelength is much greater than proportional amount of the 254 nm wavelength in the UV radiation.

The efficiency and effectiveness of a fluorescent lamp and its coating system depend on what particular phosphors are used and what wavelengths of UV radiation are absorbed. A great deal of effort has been made to increase the luminosity of fluorescent lamps without increasing the power requirements, thereby increasing their efficiencies. Currently, the most effective solution to increase luminosity involves the use of rare earth-containing phosphor compositions, including rare earth compounds and transition metal compounds that serve as host materials doped with one or more rare earth activators that, for example, prolong emission time. As nonlimiting examples, in addition to the aforementioned europium-activated BAM phosphor ($BaMg_2Al_{16}O_{27}:Eu^{2+}$) utilized as a blue-emitting phosphor, phosphor compositions have been employed that contain a controlled mixture of, cerium-and terbium-coactivated lanthanum phosphate phosphor ($LaPO_4:Ce^{3+},Tb^{3+}$; LAP) as a green-emitting phosphor, and europium-activated yttrium oxide phosphor ($Y_2O_3$:$Eu^{3+}$; YOE or YEO) as a red-emitting phosphor, mixed in appropriate ratios.

Rare earth elements are generally considered to include seventeen chemical elements, namely, the fifteen lanthanides, scandium, and yttrium. Though fairly abundant, rare earth elements are becoming increasingly prohibitive to procure and use. Demand for these materials, which are also used in medical technology, wind turbines, hybrid automobiles, TVs, smart phones, and computers, as well as other industries, has significantly increased as these technologies have grown. In addition, rare earth materials may occur as mixtures of various rare earth compounds and in low concentrations. These compounds must be mined, concentrated into oxides, and finally separated into individual rare earth elements or compounds suitable for the intended application. Finally, the majority of the world's rare earth reserves are currently believed to be in limited locations, leading to concerns over pricing and supply stability. As such, the use of rare earth elements has or may become cost-prohibitive, and effective alternative solutions are being sought.

One possible alternative is the integration of additional or alternative phosphor compounds into phosphor blends to improve the latter's efficiency and/or lumen output. Preferred phosphor compounds would be commonly occurring or easily produced in order to improve cost and production factors. In addition, it would be desirable to improve the overall efficiency of a lamp by promoting the ability of the phosphor blends to absorb and be excited by UV radiation wavelengths generated by low pressure mercury lamps.

BRIEF DESCRIPTION OF THE INVENTION

The invention provides coating systems suitable for use in generating fluorescent visible light, and to lamps provided with such coating systems.

According to a first aspect of the invention, a coating system includes a phosphor-containing coating that generates visible light as a result of being excited by ultraviolet radiation that includes at least first and second wavelengths. The phosphor-containing coating contains at least a first phosphor that predominantly absorbs and is excited by ultraviolet radiation of the first wavelength to emit visible light and absorbs but is less efficiently excited by ultraviolet radiation of the second wavelength. The coating system further includes a second phosphor that predominantly absorbs the ultraviolet radiation of the second wavelength and substantially does not absorb the ultraviolet radiation of the first wavelength. According to preferred but optional aspects of the invention, the first wavelength is a predominant wavelength of the ultraviolet radiation, and/or the first and second wavelengths are about 254 nm and about 185 nm, respectively, and/or the second phosphor is a manganese-activated barium magnesium aluminate phosphor.

Other aspects of the invention include fluorescent lamps provided with a coating system having the compositions and characteristics described above. As a particular but nonlimiting example, such a fluorescent lamp includes a sealed tube having a transparent envelope enclosing an interior chamber, a gas mixture within the sealed tube and comprising mercury vapor as an ultraviolet radiation source that emits ultraviolet radiation of at least first and second wavelengths, and a coating system on a surface of the transparent envelope within the interior chamber. The coating system includes a phosphor-containing coating that contains at least a first phosphor that predominantly absorbs and is excited by ultraviolet radiation of the first wavelength to emit visible light and absorbs but is less efficiently excited by ultraviolet radiation of the second wavelength. The coating system further includes a second phosphor that is activated only by manganese ions and absorbs the ultraviolet radiation of the second wavelength and substantially does not absorb the ultraviolet radiation of the first wavelength.

A technical effect of the invention is the ability of the second phosphor to be used in combination with at least the first phosphor, which may be a rare earth or non-rare earth phosphor, that more efficiently emits visible light when excited by UV radiation of a certain wavelength but not others, and the ability to employ the second phosphor to absorb and be excited by a wavelength at which the other phosphor less efficiently emits visible light. The second phosphor may be utilized within a coating system utilized by a fluorescent lamp to produce visible light, in which case the second phosphor may be capable of promoting the overall performance of the lamp by selectively absorbing UV radiation that is not efficiently utilized by another phosphor in the coating system and/or might damage another phosphor within the coating system.

Other aspects and advantages of this invention will be better appreciated from the following detailed description.

DETAILED DESCRIPTION OF THE INVENTION

The invention will be described hereinafter in reference to the lamp 10 shown in FIG. 1 and similar lamps 30 and 40 shown in FIGS. 2 and 3. For convenience, consistent reference numbers are used throughout the drawings to identify the same or functionally equivalent elements. It should be appreciated that the teachings of the invention are not limited to the lamps 10, 30 and 40 represented in FIGS. 1, 2 and 3, and instead are more generally applicable to various applications in which visible light is generated with the use of phosphor compounds. It should also be noted that the drawings are drawn for purposes of clarity when viewed in combination with the following description, and therefore are not necessarily to scale.

Figure 1:
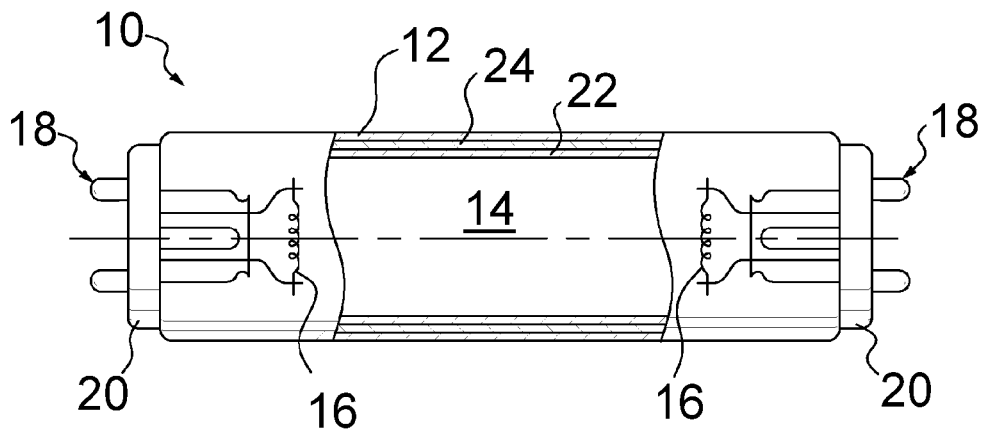
FIG. 1 represents a fluorescent lamp, a fragmentary cross-sectional view of a tube of the lamp, and an inner surface of the tube provided with a coating system that includes a phosphor-containing coating.
Figure 2:
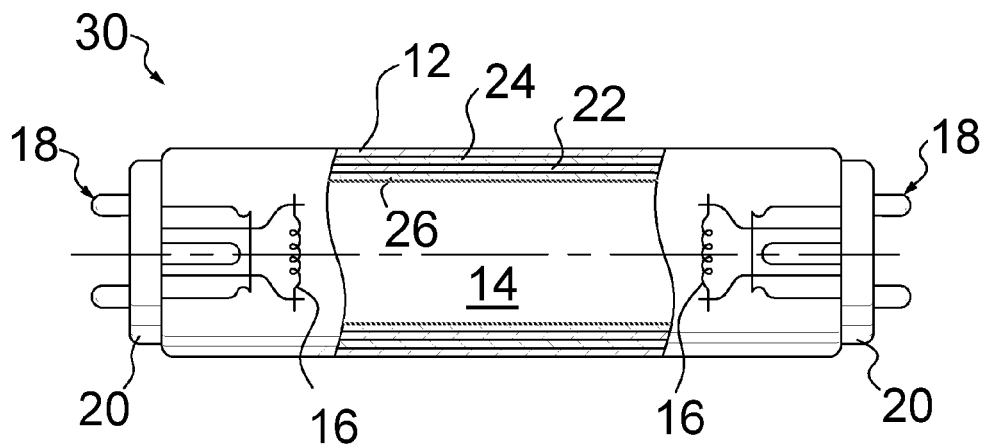
FIGS. 2 and 3 represent fluorescent lamps of the type represented in FIG. 1, but additionally including a second discrete phosphor-containing coating.
Figure 3:
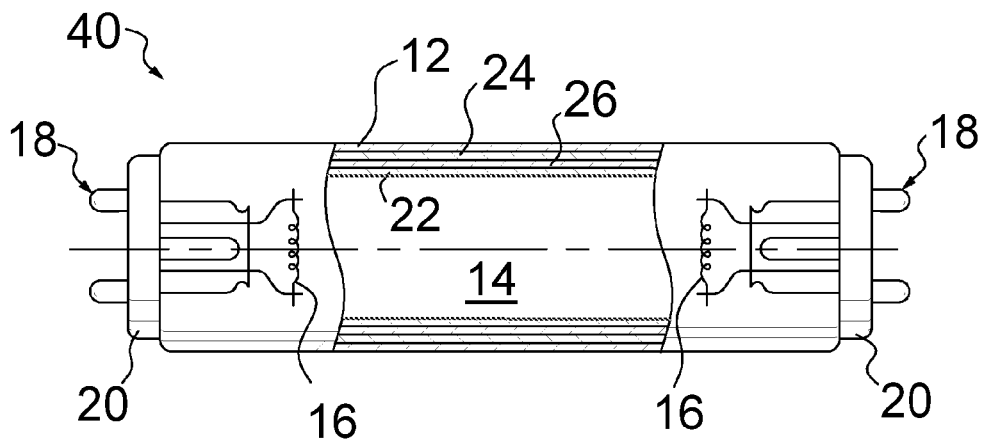

The invention relates to coating systems that include a phosphor-containing coating, such as the phosphor-containing coating 22 of FIGS. 1, 2 and 3, applied to a transparent or translucent substrate, such as the glass shell 12 of the fluorescent lamp 10. Though the coating 22 is represented in FIGS. 1, 2 and 3 as a single layer, and in the case of FIG. 1 may be the only phosphor-containing coating of the lamp 10 such that all phosphors within the coating system of the lamp 10 are within the coating 22, the coating system could comprise any number of phosphor-containing layers and coatings. In addition, any such phosphor-containing layers and/or coatings could contain constituents in addition to phosphors, for example, a scattering agent selected on the basis of its ability to scatter incoming UV radiation prior to being absorbed by the phosphors. Such a scattering agent can be provided within a phosphor-containing layer in lieu of or in addition to the UV-reflecting barrier layer 24 represented in FIGS. 1, 2 and 3.

In the nonlimiting example of FIG. 1, UV radiation emitted by an ionized constituent (for example, mercury) is absorbed by the phosphor composition within the coating 22, resulting in excitation of the phosphor composition to produce visible light that is emitted through the shell 12. In preferred examples in which the ionized constituent is mercury, the emitted UV radiation is predominantly at a wavelength of about 254 nm, with a secondary wavelength of about 185 nm. Consequently, one or more phosphors within the coating 22 are chosen on the basis of their ability to predominantly absorb and be excited by the predominant 254 nm wavelength of UV radiation, and then emit wavelengths of visible light that will provide a desired lighting effect. Notable but nonlimiting examples of such phosphors include BAM ($BaMg_2Al_{16}O_{27}:Eu^{2+}$), BAMn ($BaMg_2Al_{16}O_{27}:Eu^{2+},Mn^{2+}$), LAP ($LaPO_4:Ce^{3+},Tb^{3+}$), CBT ($GdMgB_5O_{10}:Ce^{3+},Tb^{3+}$), YEO ($Y_2O_3:Eu^{3+}$), SECA (($Sr,Ba,Ca)_5(PO_4)_3Cl:Eu^{2+}$), and CAT ($Ce_{0.66}Tb_{0.33}MgAl_{11}O_{19}$) phosphors. Though these and other phosphors absorb and are predominantly excited by the 254 nm wavelength of UV radiation to produce visible light, these phosphors may also absorb the 185 nm wavelength of UV radiation without generating a significant level of visible light therefrom. In addition, certain phosphors may even be damaged by the absorption of the 185 nm wavelength, notable examples of which may include phosphors known as strontium blue ($Sr_5(PO_4)_3(F,Cl):Sb^{3+},Mn^{2+}$) and strontium red ($Sr_3(PO_4)_2:Sn^{2+}$).

According to a preferred aspect of the invention, a coating system that contains at least one phosphor-containing coating is modified to further contain a composition that absorbs UV wavelengths that, if absorbed by one or more phosphors within the coating system, might limit or reduce the efficiency of the phosphor-containing coating and/or might damage another phosphor in the coating. In the example of FIG. 1, the additional composition can be incorporated directly into the phosphor-containing layer 22, whereas in the examples of FIGS. 2 and 3 the additional composition is incorporated into a discrete and separate coating 26 within the coating system.

In preferred embodiments in which the ionized constituent within the lamp chamber 14 is mercury and the predominant and secondary wavelengths of UV radiation are about 254 nm and about 185 nm, respectively, the additional composition within the coating system absorbs most (e.g., at least 95%) if not all of the UV radiation of the 185 nm wavelength, and absorbs little (e.g., not more than 5%) if any of the UV radiation of the predominant 254 nm wavelength. A particular but nonlimiting example of such an additional composition (hereinafter referred to as the "second phosphor") is a manganese-activated barium magnesium aluminate phosphor, which is activated only by manganese ions and is predominantly excited by UV radiation having a wavelength of about 185 nm and substantially does not absorb UV radiation having a wavelength of about 254 nm. As such, the manganese-activated barium magnesium aluminate phosphor absorbs a wavelength of UV radiation that, if absorbed by other phosphors within the coating 22, might reduce the visible light-generating efficiency of the coating 22 and/or possibly the efficiency by which the other phosphors within the coating 22 emit visible light. The behavior of this phosphor, whose formula may be $BaMg_2Al_{16}O_{27}:Mn^{2+}$, is in contrast to other barium magnesium aluminate compositions, particularly $BaMg_2Al_{16}O_{27}:Eu^{2+}$ (BAM) and $BaMg_2Al_{16}O_{27}:Eu^{2+},Mn^{2+}$ (BAMn), that are widely used in fluorescent lamps based on their ability to efficiently generate visible light when excited by UV radiation of wavelengths other than 185 nm, particularly the 254 nm wavelength. However, as with other phosphors widely used in phosphor-containing coatings, for example, LAP and CBT phosphors, BAM and BAMn do not efficiently produce visible light from their absorption of the 185 nm wavelength. The behavior of the manganese-activated barium magnesium aluminate phosphor is also in contrast to certain phosphors whose performance might be diminished as a result of absorbing the 185 nm wavelength, for example, phosphors such as strontium red or strontium blue that are damaged by the 185 nm wavelength.

In view of the above, the second phosphor is preferably capable of promoting the overall performance of the fluorescent lamp 10, for example, by increasing its lumen output, through one or more of several possible mechanisms. A first mechanism is that the second phosphor absorbs UV radiation that might not be as efficiently utilized by other phosphors within the phosphor-containing coating 22. A second mechanism is that the second phosphor absorbs little (e.g., not more than 5%) if any of the UV radiation that may be needed to efficiently excite other phosphors within the coating 22. A third possible mechanism is that the second phosphor absorbs UV radiation that might damage other phosphors within the coating 22, which could degrade the visible light-generating efficiency of the coating 22 over time. Though the manganese-activated barium magnesium aluminate phosphor is a particular phosphor having these capabilities, it is foreseeable that other compositions could be determined to have these characteristics, and such other compositions are within the scope of the invention.

As previously noted, whereas the manganese-activated barium magnesium aluminate phosphor discussed above (or any substitute therefor) is directly incorporated into the phosphor-containing coating 22 of FIG. 1 such that the manganese-activated barium magnesium aluminate phosphor is a constituent of a blend of rare earth or non-rare earth phosphors within the coating 22, the manganese-activated barium magnesium aluminate phosphor (or any substitute therefor) can be incorporated into a separate coating 26 as represented in FIGS. 2 and 3. In the embodiment of FIG. 2, the coating 26 is presented as being between the phosphor-containing coating 22 and the chamber 14 containing the source of UV radiation. In this scenario, the coating 26 serves as a barrier capable of absorbing the 185 wavelength prior to encountering the phosphor-containing coating 22, which enables the coating 26 to protect other phosphors within the coating 22 whose performance might be diminished as a result of absorbing the 185 nm wavelength, for example, phosphors such as strontium red or strontium blue that are damaged by the 185 nm wavelength. As previously discussed, the coating 26 preferably provides this benefit while absorbing little if any of the 254 wavelength needed by the phosphors within the phosphor-containing coating 22 to efficiently produce visible light. In the embodiment of FIG. 3, the phosphor-containing coating 22 is presented as being between the coating 26 and the chamber 14 containing the source of UV radiation. In this scenario, depending on the particular phosphors within the phosphor-containing coating 22, UV radiation of the 185 nm wavelength may pass through the phosphor-containing coating 22 and enter the coating 26, where the 185 nm wavelength can be absorbed by the manganese-activated barium magnesium aluminate phosphor (or any substitute therefor), resulting in excitation of the manganese-activated barium magnesium aluminate phosphor to emit visible light.

While the invention has been described in terms of specific embodiments, it is apparent that other forms could be adopted by one skilled in the art. For example, the physical configuration of a lamp could differ from those shown, and materials and processes other than those noted could be used. Furthermore, other compositions could be identified that are capable of selectively absorbing UV radiation of a certain wavelength while not absorbing UV radiation of another wavelength in order to promote the efficiency of one or more phosphors used by a fluorescent lamp. Therefore, the scope of the invention is to be limited only by the following claims.

The invention claimed is:

1. A coating system comprising a phosphor-containing coating that generates visible light as a result of being excited by ultraviolet radiation that includes at least first and second wavelengths, the phosphor-containing coating comprising:
   at least a first phosphor that predominantly absorbs and is excited by ultraviolet radiation of a first wavelength to emit visible light and absorbs but is less efficiently excited to emit visible light by ultraviolet radiation of a second wavelength; and
   a second phosphor that preferentially absorbs the ultraviolet radiation of the second wavelength compared to the first wavelength, and is excited by the second wavelength to emit visible light;
   wherein the second phosphor is a manganese-activated barium magnesium aluminate phosphor that is activated only by manganese ions, wherein the second phosphor comprises formula $BaMg_2Al_{16}O_{27}:Mn^{2+}$, wherein the second phosphor absorbs the ultraviolet radiation of the second wavelength and is excited by the second wavelength to emit visible light.

2. The coating system according to claim 1, wherein the first wavelength is a predominant wavelength of the ultraviolet radiation.

3. The coating system according to claim 1, wherein the first wavelength is about 254 nm and the second wavelength is about 185 nm.

4. The coating system according to claim 1, wherein the second phosphor is dispersed in the phosphor-containing coating.

5. The coating system according to claim 1, wherein the coating system comprises a second coating that contains the second phosphor.

6. The coating system according to claim 5,
   wherein the second coating is between the phosphor-containing coating and a source of ultraviolet radiation that emits the first and second wavelengths,
   and the ultraviolet radiation of the second wavelength is substantially absorbed by the second phosphor within the second coating prior to encountering the phosphor-containing coating.

7. The coating system according to claim 5, wherein the phosphor-containing coating is between the second coating and a source of ultraviolet radiation that emits the first and second wavelengths, and the ultraviolet radiation of the second wavelength is substantially absorbed by the second phosphor within the second coating after passing through the phosphor-containing coating.

8. The coating system according to claim 1, wherein the first phosphor is at least one selected from BAM, BAMn, LAP, CBT, YEO, strontium blue, strontium red, SECA, or CAT.

9. The coating system according to claim 1, wherein the coating system is on a substrate of a fluorescent lamp.

10. A coating system comprising a phosphor-containing coating that generates visible light as a result of being excited by ultraviolet radiation that includes at least first and second wavelengths having wavelengths of about 254 nm and about 185 nm, respectively, wherein the first wavelength is a predominant wavelength of the ultraviolet radiation, the phosphor-containing coating comprising:
    at least a first phosphor that is predominantly excited by ultraviolet radiation of the first wavelength to emit visible light and absorbs but is less efficiently excited to emit visible light by ultraviolet radiation of the second wavelength; and
    a manganese-activated barium magnesium aluminate phosphor that is activated only by manganese ions, that preferentially absorbs the ultraviolet radiation of the second wavelength compared to the first wavelength, and is excited by the second wavelength to emit visible light.

11. The coating system according to claim 10, wherein the manganese-activated barium magnesium aluminate phosphor is dispersed in the phosphor-containing coating.

12. The coating system according to claim 10, wherein the coating system comprises a second coating that contains the manganese-activated barium magnesium aluminate phosphor.

13. The coating system according to claim 10, wherein the coating system is on a substrate of a fluorescent lamp.

14. A fluorescent lamp comprising:
    a sealed tube comprising a transparent envelope enclosing an interior chamber;
    a gas mixture within the sealed tube, the gas mixture comprising mercury vapor as an ultraviolet radiation source that emits ultraviolet radiation of at least first and second wavelengths; and
    a coating system as in claim 10 on a surface of the transparent envelope within the interior chamber.

15. The fluorescent lamp according to claim 14, wherein the manganese-activated barium magnesium aluminate phosphor is dispersed in the phosphor-containing coating.

16. The fluorescent lamp according to claim 14, wherein the coating system comprises a second coating that contains the manganese-activated barium magnesium aluminate phosphor, and either:
    the second coating is between the phosphor-containing coating and the ultraviolet radiation source and the second coating substantially absorbs the ultraviolet radiation of the second wavelength prior to encountering the phosphor-containing coating; or
    the phosphor-containing coating is between the second coating and the ultraviolet radiation source and the second coating substantially absorbs the ultraviolet radiation of the second wavelength after passing through the phosphor-containing coating.

17. A phosphor-containing coating system that generates visible light as a result of being excited by ultraviolet radiation that includes at least first and second wavelengths, the phosphor-containing coating system comprising:
    at least a first phosphor that predominantly absorbs and is excited by ultraviolet radiation of a first wavelength to emit visible light and absorbs but is less efficiently excited to emit visible light by ultraviolet radiation of a second wavelength, wherein the first wavelength is about 254 nm and the second wavelength is about 185 nm; and
    a second phosphor that absorbs most or all of incident ultraviolet radiation of the second wavelength and substantially does not absorb ultraviolet radiation of the first wavelength, wherein the second phosphor is excited by the second wavelength to emit visible light.

18. The phosphor-containing coating system of claim 17, wherein the second phosphor absorbs not more than 5% of incident UV radiation of first wavelength.

19. The phosphor-containing coating system of claim 18, wherein the second phosphor absorbs at least 95% of incident UV radiation of the second wavelength.

\* \* \* \* \*